April 23, 1929.　　　W. G. McMURRAY　　　1,710,178
GAS TRAP AND FLOW TANK
Filed Sept. 29, 1927

W. G. McMurray
INVENTOR

BY John M. Spellman
ATTORNEY

Patented Apr. 23, 1929.

1,710,178

UNITED STATES PATENT OFFICE.

WILLIAM G. McMURRAY, OF WICHITA FALLS, TEXAS, ASSIGNOR TO M. & V. TANK COMPANY, OF WICHITA FALLS, TEXAS, A CORPORATION.

GAS TRAP AND FLOW TANK.

Application filed September 29, 1927. Serial No. 222,785.

This invention relates to improvements in gas traps and flow tanks and more especially to the specific construction and arrangement thereof.

The general object of the invention is to provide a tank for receiving oil and gas from flowing wells or pumped wells and for thoroughly separating the oil and gas quickly and expeditiously.

A further object of the invention is to provide means for automatically discharging both the oil and gas, at the same time maintaining a predetermined pressure in the tank.

Still another object of the invention is to provide a series of upper and lower baffles, so arranged as to effect a maximum separation of the oil from the gas, also reduces the rock pressure before it enters the separator.

Finally the object of the invention is to provide individual oil drains for certain of the baffles and for conducting the drained oil into a float box.

The invention will be clearly understood from a perusal of the following detailed description, taken in connection with the accompanying drawings and wherein.

Figures 1, 2, 3, 4:
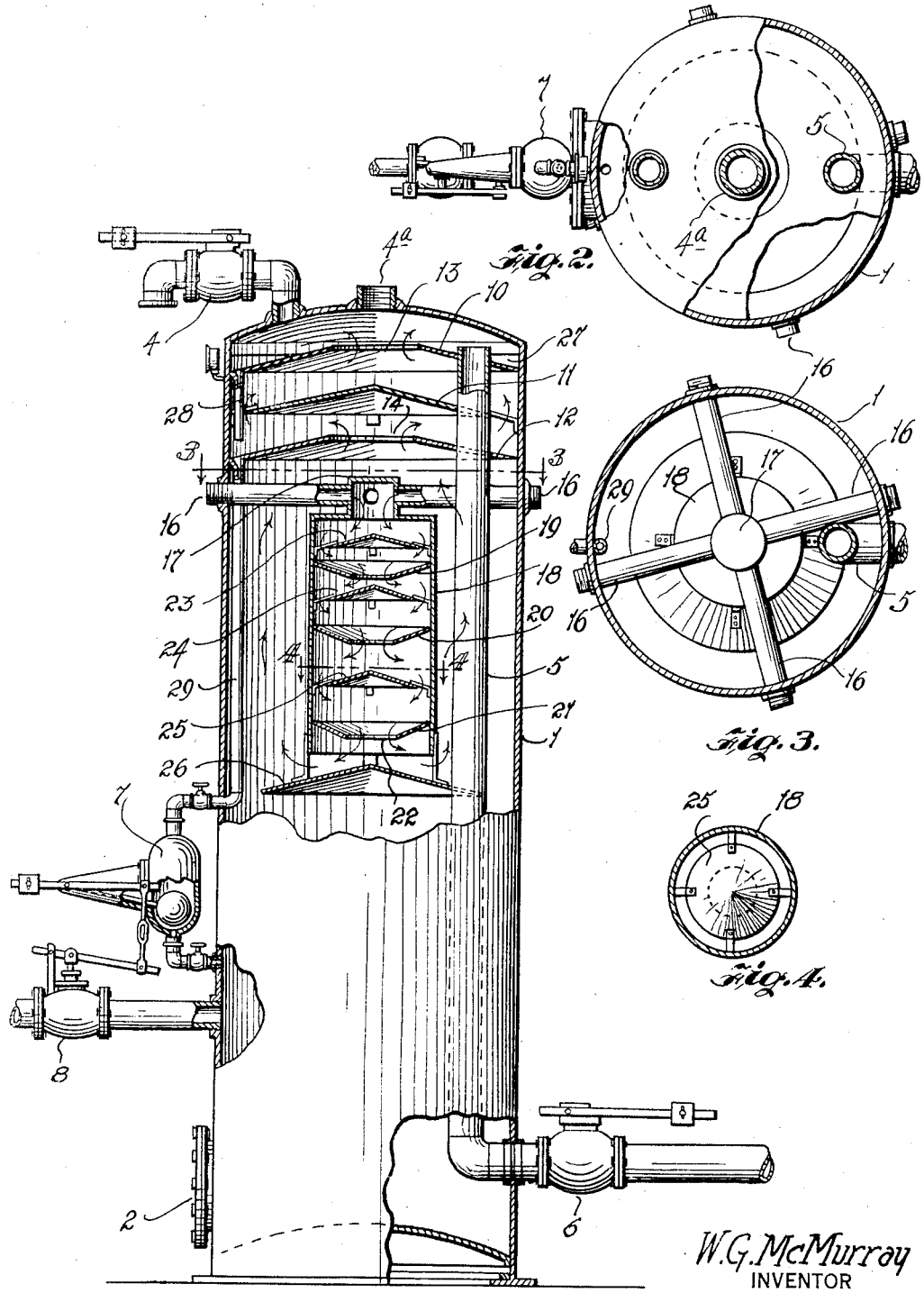
Figure 1 is a partial side and vertical sectional view of an oil and gas separator tank embodying the invention.
Figure 2 is a top plan view, partly broken away.
Figure 3 is a detailed sectional view along the line 3—3 of Figure 1.
Figure 4 is a cross-sectional view of the lower baffles, the view being taken along the lines 4—4 of Figure 1.

Proceeding in accordance with the drawings and wherein different numerals designate the various parts, 1 denotes the shell or tank body of a preferred form of tank in which the invention is embodied. The tank has also a clean-out plate 2, safety valve 4, gas outlet pipe 5, pressure valve 6, including a float box 7 having connection with a balance valve 8, the latter being connected to an oil outlet leading to a stock tank. These various parts while not being a part of the invention, are illustrated for the sake of more clearly understanding the type of separator to which the invention relates.

In the interior of the tank are arranged a series of upper and lower baffles of substantially cone-shape as shown at 10, 11 and 12, and secured to the wall of the separator and around the outlet pipe 5 in the manner shown. The baffles 10 and 12 have a central opening 13 and 14 and spaced intermediate of these baffles is a third baffle 11.

Below the baffle 12 are introduced a plurality of oil and gas inlet pipes 16 for conducting the fluid into the tank from a well. These pipes in the preferred form are formed onto a header 17, the header having connection or being formed integrally with a hollow cylindrical element 18. This element has spaced apart therein a number of smaller baffles 19, 20 and 21, of substantially inverted cone shape, each baffle having a central opening 22 and secured to the walls of the cylindrical element 18 as shown. The baffles 23, 24 and 25 are spaced away from the tank walls to permit passage of the gas. Above each of the baffles 19, 20 and 21 are disposed baffles 23, 24 and 25. At the bottom or mouth of the element 18 is suspended a final baffle 26.

The baffle 10 has an annular upturned rim 27 formed integrally with a tube 28 and the baffle 12 is connected to a pipe 29 which leads to the float box 7. The baffle 12 is slanted as will be seen in Figure 1. The object of the upturned rim 27 and the slanted position of the baffle 12 is to cause the oil which collects upon the baffles 10 and 12 to be delivered into the float box 7.

In operation, the oil and gas enters the separator through the pipes 16 and falls upon the baffles in the tubular or cylindrical element 18. As the oil flows downwardly in the direction of the arrows in a sinuous passage it finally flows over the rim of the last baffle 26. The gas which is released and separated from the oil flows upwardly in the direction of the arrow. The gas flows through the opening 14 in the baffle 12 and passes around the rim of the baffle 11, thence through the opening 13 to the top of the tank.

What is claimed is:

An oil and gas separator comprising a tank including oil and gas mixture inlets and oil and gas outlets, a series of cone-shaped upper baffles the alternate ones of which extending completely across said tank and have central perforations therein, and the intermediate ones being spaced from the walls of said tank, a cylindrical element axially positioned within said tank and having its upper end communicating with said oil and gas mixture inlets, a series of lower baffles, the alternate ones of which being of upright and the intermediate ones being of inverted cone shape and enclosed within said cylindrical element, said inverted baffles having central openings therein and extending completely across between the walls of said cylindrical element, said upright baffles being spaced from the walls of said cylindrical element to provide a zigzag path for the passage of the oil and gas mixture downwardly from said oil and gas mixture inlets through said cylindrical element, a bottom baffle secured to but spaced from the lower end of said cylindrical element and being of upright cone shape with its periphery extending outwardly beyond the periphery of said cylindrical element to carry the oil and gas mixture outwardly from the cylindrical element permitting the oil to drop off the edge of said bottom baffle and at the same time permitting the gas to rise from said bottom baffle and pass upwardly around said cylindrical element, said alternate upper baffles providing a zigzag path for said gas, directed upward from said bottom baffle, and pipes secured to the outer peripheries of said upright upper baffles for draining oil collected during the zigzag passage of the gas through said upper baffles.

In testimony whereof I affix my signature.

WILLIAM G. McMURRAY.